March 18, 1924.

C. A. BODDIE 1,486,860

VOLTAGE REGULATING SYSTEM

Filed May 26, 1917

WITNESSES:
William Siler
D. C. Davis

INVENTOR
Clarence A. Boddie.
BY
Wesley Sloan
ATTORNEY

Patented Mar. 18, 1924.

1,486,860

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

VOLTAGE-REGULATING SYSTEM.

Application filed May 26, 1917. Serial No. 171,171.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Voltage-Regulating Systems, of which the following is a specification.

My invention relates to systems of voltage regulation, and it has for its object to provide a system of the character designated that shall be rapid and sensitive in its response to the voltage-regulating apparatus, thus producing a smooth and uniform regulation of the voltage.

Figure 1:
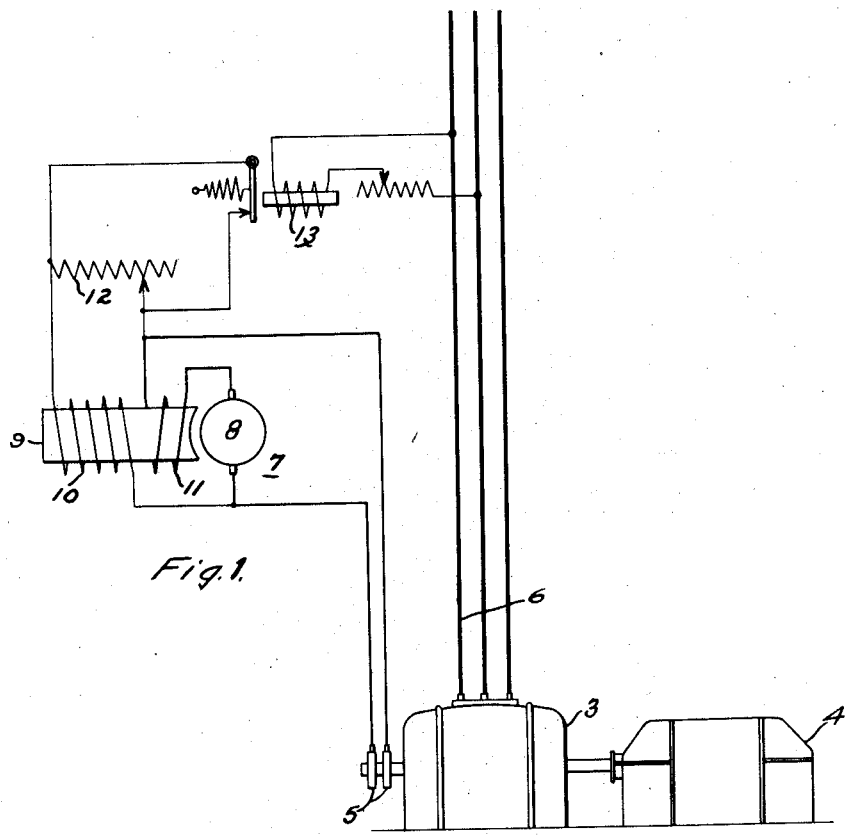
Figure 2:
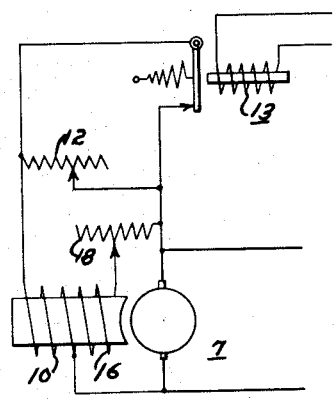

In the accompanying drawings, Fig. 1 is a diagrammatic view of the elements of a control system embodying a preferred form of my invention; and Fig. 2 is a partial view of a control system embodying a modified form of my invention.

In the operation of voltage-regulating systems, particularly those arranged for regulating the voltage of large alternating-current generators, it is usual to associate a Tirrill-type regulator with the field circuit of an exciter machine which, in turn, energizes the field winding of the alternating-current generator. The Tirrill-type regulator is energized in accordance with the output voltage of the alternating-current generator and serves to periodically short-circuit the field rheostat of the exciter machine, all as is well known and understood in the art.

It will be noted that the field windings of the alternating-current generator constitute the major portion of the load of an exciter machine of the type just described. Thus, the load is highly inductive in nature and, when the regulator attempts to lower the voltage of the alternating-current generator by reducing the net excitation of the field winding thereof through the intermediary of the exciter machine, the response of the system is very sluggish because of this highly inductive load and the necessary dissipation of the energy stored therein.

It is known that the action of compound-wound exciter machines is particularly sluggish in this respect as said machines have a substantially flat characteristic and do not readily lower their output voltage.

It has, therefore, been the usual practice, in the past, to employ exciter machines of the shunt type, wherein the voltage-characteristic curve falls quite rapidly. Thus a reduction in the excitation of the exciter machine, brought about by separation of the regulator contacts and the consequent inclusion of the field rheostat in circuit, tends to produce a rapid drop in the exciter voltage and, consequently, permits a rapid discharge of the field energy of the main generator and thus promotes the sensitiveness of the system, as a whole.

In accordance with the present invention, I still further enhance the rapidity of response of a system of the character indicated by providing an exciter machine having two distinct exciting field windings which are normally so energized that their magnetomotive forces oppose each other. The energization of one of said field magnets is subject to the control of the Tirrill-type regulator and is periodically adjusted thereby to major and minor values. The remaining field winding is normally energized to produce a magnetomotive force intermediate said major and minor values of the excitation of the first-named field magnet. Thus, when the voltage of the generator is low, permitting the contact members of the Tirrill-type regulator to move into engagement, the excitation of the first-named field winding predominates, and a resultant magnetomotive force in one direction operates to reduce the exciter voltage. When, on the other hand, the voltage of the generator rises to such value as to separate the contact members of the Tirrill-type regulator, the inclusion of the exciter field rheostat in circuit causes the energization of the first-named field winding to become subordinate to that of the other field winding and thus reverses the net or resultant magnetomotive force impressed upon the exciting field magnet of the exciter machine, tending to reverse the voltage thereof but not being able to do so immediately because of the discharge of energy from the field windings of the generator. There is produced, however, an extremely rapid reduction in the voltage of the exciter machine and, therefore, an extremely quick response to the Tirrill-type regulator, on lowering voltage.

Referring to the drawings for a more detailed understanding of my invention, I show a generator of relatively large capacity at 3 in Fig. 1. The generator 3 is shown as of the alternating-current type, being provided with a stationary armature and with a rotating field and being driven by a suitable prime mover 4. Energy is supplied to the field through suitable slip rings 5, and the output from the armature is supplied to suitable leads 6. Energy for the excitation of the generator field winding is derived from an exciter machine 7 comprising an armature 8 and a field pole 9 provided with two field windings 10 and 11. The field winding 10 is shown as of the shunt type, being controlled by a suitable rheostat 12, and the field winding 11 is shown as of the series type. The connections are such that the magnetomotive forces of the field windings 10 and 11 normally oppose each other. The field rheostat 12 may be short circuited by a Tirrill-type regulator controlled by the output voltage of the generator 3, as is well known and understood.

When the voltage of the alternating-current generator is slightly below the desired value, the contact members of the regulator 13 are closed, short circuiting the rheostat 12 and permitting a maximum energization of the field winding 10. This excitation is such that it predominates over the effect of the field winding 11 and produces such net excitation of the exciter machine 7 as to increase the field excitation of the generator 3 and, consequently, to raise the voltage thereof.

When the voltage of the generator 3 slightly exceeds the desired value, the contact members of the regulator 13 are separated, thus permitting the rheostat 12 to become operative and radically reduce the excitation of the field winding 10. This reduction is so pronounced that the magnetomotive force of the series field winding 11 preponderates over the shunt field winding, producing a reversal in the net excitation of the exciter machine. As a consequence, the voltage of said machine tends to fall very rapidly and would, in fact, reverse and build up in the opposite direction within a very short period of time were it not for the fact that the stored energy of the field windings of the generator 3, discharging through the field circuit in accordance with Lenz's law, tends to maintain the circulation of current in the exciting circuit in the original direction for an appreciable period of time.

The reduction of voltage in the generator 3 is very abrupt and soon falls to such a value as to permit engagement of the contact terminals of the regulator, when the cycle is again repeated.

Thus, it will be noted that, when it is desired to raise the voltage of the generator 3, a magnetomotive force in one direction is produced in the exciter machine 7 and, when it is desired to lower the voltage of the main generator, a magnetomotive force in the other direction is established within the exciter machine 7.

While I have shown the field winding 10 as of the shunt type, whereas the field winding 11 is of the series type, thus producing a differential compound exciting machine, it is obvious that I may, if desired, employ two distinct shunt-type field windings, as indicated at 10 and 16 in Fig. 2. The winding 16 is provided with a regulating rheostat 18, and the winding 10 is connected as before. The rheostat 18 is so adjusted that the excitation of the field winding 16 is intermediate in value between the major and minor values of the excitation of the field winding 10, thus producing a similar action to that previously set forth.

While, throughout this application, I have laid emphasis upon the actual reversal of the magnetomotive force impressed upon the exciter field poles when it is desired to lower the generator voltage, extremely good operation may be obtained without going to this extreme but merely by the use of a differential compound exciter machine wherein the series winding promotes an exceedingly rapid fall in the voltage without, however, actually reversing the same. In other words, the series excitation is not sufficiently powerful to, at any time, overpower the minor value of the shunt field excitation. The reasons previously set forth for the more prompt regulating response with a shunt wound exciter than with a cumulative compound exciter apply with equal force in causing a quicker response with a differentially compound exciter than with a shunt-wound exciter machine.

While I have shown my invention in two of its preferred forms, it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:—

1. In a system of voltage regulation, the combination with an alternating-current dynamo-electric machine and a Tirrill-type regulator, of a differential-compound exciter therefor, and means whereby said regulator periodically adjusts the excitation of the shunt field winding of said exciter from a major value to a minor value, the series excitation of said exciter being intermediate said two values of the excitation of said shunt winding.

2. In a voltage-regulating system for an alternating-current circuit, the combination with an exciter machine provided with a shunt exciting winding energized in proportion to the voltage to be controlled and subject to the action of a Tirrill regulator to vary its excitation between predetermined maximum and minimum values to assist in maintaining said voltage, of an auxiliary field winding on said exciter machine energized in accordance with the load current therethrough and connected and proportioned to produce a magneto-motive force at normal load in opposition to the magneto-motive force of said shunt field winding and intermediate between said maximum and minimum values, whereby said machine is enabled to rapidly vary the voltage impressed upon the excitation circuit.

In testimony whereof, I have hereunto subscribed my name this 7th day of May, 1917.

CLARENCE A. BODDIE.